US012438768B2

(12) United States Patent
Murray

(10) Patent No.: US 12,438,768 B2
(45) Date of Patent: Oct. 7, 2025

(54) METHOD TO STABILIZE A RING DURING LINK FLAPPING

(71) Applicant: Hewlett Packard Enterprise Development LP, Spring, TX (US)

(72) Inventor: Christopher S. Murray, Boynton Beach, FL (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 356 days.

(21) Appl. No.: 18/133,320

(22) Filed: Apr. 11, 2023

(65) Prior Publication Data

US 2024/0348492 A1    Oct. 17, 2024

(51) Int. Cl.
*H04L 41/0654* (2022.01)
*H04L 12/46* (2006.01)
*H04L 43/0811* (2022.01)

(52) U.S. Cl.
CPC ...... *H04L 41/0654* (2013.01); *H04L 12/4654* (2013.01); *H04L 43/0811* (2013.01)

(58) Field of Classification Search
None
See application file for complete search history.

(56) References Cited

U.S. PATENT DOCUMENTS

| 2004/0223503 A1* | 11/2004 | Lynch ............... H04L 12/42 370/461 |
| 2009/0268746 A1* | 10/2009 | Ogasahara .......... H04L 61/2596 370/406 |
| 2010/0246385 A1* | 9/2010 | Balasumbramanian .................... H04L 41/0226 370/222 |

* cited by examiner

*Primary Examiner* — Angela Nguyen
(74) *Attorney, Agent, or Firm* — Yao Legal Services, Inc.

(57) ABSTRACT

A system monitors metrics relating to link flapping associated with a physical link in a ring network. Network management traffic is transported via a first VLAN and customer data traffic is transported via a second VLAN. The system maintains a signal fail state for the ring network based on the monitored metrics. If a first condition associated with the first VLAN is detected, the system disallows customer data traffic on the second VLAN. If a second condition associated with the monitored metrics is detected, the system disallows network management traffic on the first VLAN and disallows customer data traffic on the second VLAN, resulting in the signal fail state. If the second condition is no longer met, the system allows network management traffic on the first VLAN. If the first condition is no longer met, the system allows customer data traffic on the second VLAN, resulting in the idle state.

20 Claims, 8 Drawing Sheets

METHOD TO STABILIZE A RING DURING LINK FLAPPING

BACKGROUND

Field

Nodes in a ring network may experience link flapping, i.e., when physical links between two nodes go up and down in state. Network management traffic (such as continuity check protocol (CCP) messages) may be transported via a first virtual local area network (VLAN) and customer data traffic may be transported via a second VLAN. On a physical link between two nodes, link flapping can affect the communication rate of CCP messages, which can affect when the ring owner may switch the ring network from an "idle state" to a "signal fail" state. Thus, frequent link flapping may unnecessarily cause frequent switching, which can create issues in forwarding traffic and customer uplink issues to an external network.

BRIEF DESCRIPTION OF THE FIGURES

In the figures, like reference numerals refer to the same figure elements.

DETAILED DESCRIPTION

Aspects of the instant application can address the issues created by frequent switching between idle and signal fail states by providing a system which monitors link flapping at the hardware level of the switch. When link flapping is detected on a physical link, the system can disable, on the physical link, network management traffic on the management VLAN and customer data traffic on the customer VLAN. This can place the ring network in the signal fail state, while the system continues to monitor the link flapping. The ring network can thus stay in the signal fail state based on the monitored link flapping instead of based on the communication rate of CCP messages (as in conventional systems). The ring network can return to the idle state only when both the link flapping and the CCP message communication rate reach an acceptable threshold, thus reducing the frequency of switching and the consequential issues.

The terms "network modules," "network nodes," "network devices," "nodes," and "frame link modules" (FLMs) are used interchangeably in this disclosure and refer to devices, components, units, or entities (such as switches) which can be configured in a ring topology and can communicate with other similar nodes in the manner described herein. Frame link modules (FLMs) can be used as an example of link flapping, but the described aspects can apply to any group of linked network modules in a linear or ring topology that experiences link flapping or link errors.

The terms "frames" and "enclosures" are used interchangeably in this disclosure and refer to a grouping of one or more nodes or FLMs (as defined above). In some aspects, a frame can include two FLMs or nodes for redundancy purposes.

The term "link flapping" refers to an event which occurs when a physical link between two nodes goes up and down in state. The term "link errors" refers to errors related to the physical link between two nodes, including but not limited to framing errors and cyclic redundancy check (CRC) errors.

The term "stabilizing a ring during link flapping" refers to managing link flapping and link errors in a ring network with a plurality of nodes, as described herein.

The term "conventional system" is used in this disclosure to refer to any approach, system, method, architecture, or design which currently exists and over which the described aspects provide improved stabilization of a ring in the presence of link flapping or link errors and which also provide reduced frequency of switching between the signal fail state and the idle state.

Environment for Stabilizing a Ring During Ring Flapping

Figure 1:
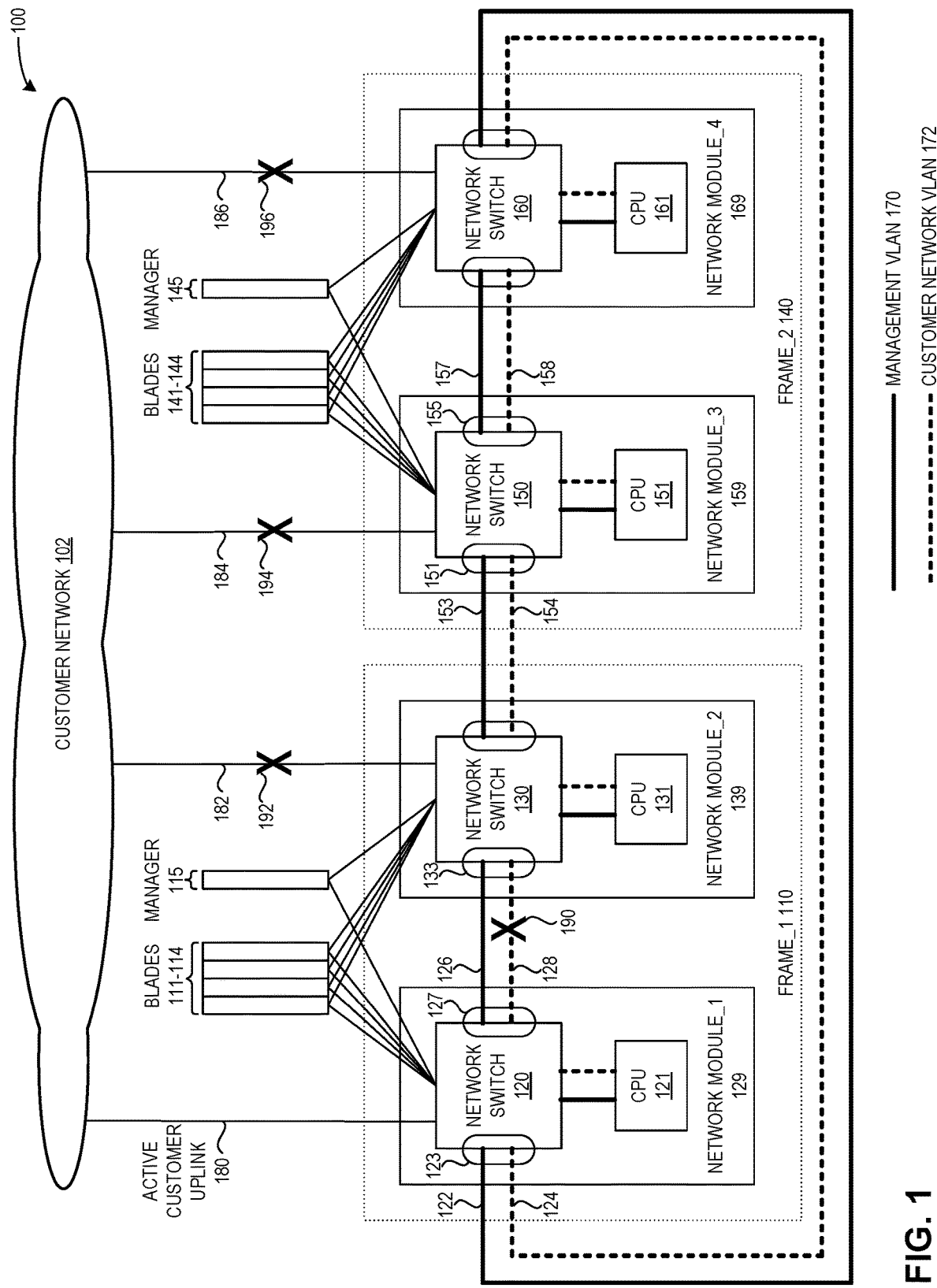
FIG. 1 illustrates an environment which facilitates stabilizing a ring during link flapping in accordance with an aspect of the present application.

FIG. 1 illustrates an environment 100 which facilitates stabilizing a ring during link flapping, in accordance with an aspect of the present application. Environment 100 can include multiple customer uplinks (180, 182, 184, and 186) to a ring network via a customer network 102. Only one of the customer uplinks may be active, as depicted by an active customer uplink 180 and bold "X's" 192, 194, and 196 indicated on, respectively, uplinks 182, 184, and 186.

The ring network in environment 100 can include multiple frames. Two frames are depicted, where each frame includes two network modules (or nodes or FLMs). The network modules can include a network switch and a central processing unit (CPU). The network modules can communicate with each other over physical links via two VLANs and can further communicate with server blades, managers, and a customer network. For example, a frame_1 110 can include: a network module_1 129, which includes a network switch 120 and a CPU 121; and a network module_2 139, which includes a network switch 130 and a CPU 131. Similarly, a frame_2 140 can include: a network module_3 159, which includes a network switch 150 and a CPU 151; and a network module_4 169, which includes a network switch 160 and a CPU 161. Network switches 120 and 130 in frame_1 110 can communicate with blades 111-114 and a manager 115, while network switches 150 and 160 in frame_2 140 can communicate with blades 141-144 and a manager 145. While managers 115 and 145 are depicted as communicating, respectively, with only network switches 120/130 and 150/160, managers 115 and 145 can communicate with all devices in all frames.

Each network switch can include two link ports: an internal link (I-Link) port which can link two network modules in a frame (i.e., two FLMs in an enclosure); and an external link (E-Link) which can link a network module in one frame to another network module in an adjacent frame (i.e., an FLM in one enclosure to another FLM in an adjacent enclosure). For example, network switch 120 can include an E-Link port 123 which links network switch 120 of frame_1 110 to network switch 160 of frame_2 140. Network switch 120 can also include an I-Link port 127 which links network switch 120 to network switch 130 of the same frame_1 110.

Each CPU in a network module can program and configure the corresponding switch in the network module. The CPU can also run the G.8032 protocol, which uses Ring Automatic Protection Switching (R-APS) messages to control the state of the ring as well as FLMs or nodes in the network. The CPU can transmit and receive G.8032 R-APS messages to/from the link ports on the switch. For example, CPU 121 in network module_1 129 can program and configure network switch 120, and CPU 121 can also handle communication of G.8032 messages to/from E-Link 123 and I-Link port 127 on network switch 120.

Network switches 120, 130, 150, and 160 can be involved in transporting different types of traffic over different VLANs. In FIG. 1, network management traffic can be transported over a management VLAN (as indicated by the solid bold line for a management VLAN 170 in the index), while customer data traffic can be transported over a customer network VLAN (as indicated by the dashed bold line for a customer network VLAN 172 in the index). Thus, network switch 120 can transmit and receive network management traffic over a management VLAN (122, via link port 123, and 126, via link port 127) and can further transmit and receive customer data traffic over a customer network VLAN (124, via link port 123, and 128, via link port 127). Each link port can be considered the end of a single physical link.

Each network switch (or node or FLM) can use its links (e.g., the E-Link and the I-Link) as redundant links. If the system determines that a physical link experiences a link error (e.g., a link detection error or a loss of contact with the G.8032 protocol), both of the nodes connected via the physical link can declare an R-APS Signal Fail (SF) message and send the SF message to its respective adjacent node via its redundant link, i.e., the link is not experiencing the link error. The SF message can be used to notify all nodes in the ring of a link failure in the network and can further notify the ring owner (i.e., the Ring Protection Link (RPL) owner) to enable its blocked RPL link (e.g., notify RPL owner 120 to enable customer data traffic 128 over the customer network VLAN, which was initially blocked in order to prevent loops of customer data traffic, as depicted by a bold "X" 190). The SF message, the RPL owner, and the RPL link are described further below in relation to FIGS. 2 and 3.

Upon receiving the SF message, the Ring Protection Link (RPL) owner node can enable its blocked RPL link, which allows customer data traffic to continue to flow between the nodes in the ring. The network may now be configured in a linear topology, with both of the involved "end" nodes transmitting the SF message, which places the network in a "signal fail state." Each end node will receive the SF message from the other end node. When the system determines that the link error is no longer detected on the physical link, the end nodes can stop transmitting the SF message, which will result in the RPL owner disabling (or re-blocking) its enabled RPL link, thus returning the network to an "idle state." Ring configurations and communications depicting the idle state and the signal fail state are described below in relation to FIG. 3.

The G.8032 protocol can define VLANs that are assigned to spanning tree groups (STGs), where enabling/disabling (i.e., allowing/disallowing) traffic via a particular STG results in enabling/disabling (i.e., allowing/disallowing) traffic via all VLANs assigned to the particular STG. By enabling/disabling STGs, the system can control all the network management traffic and the customer data traffic in the ring, as described below in relation to FIG. 2.

The G.8032 Continuity Check Protocol (CCP) defines a point-to-point protocol which sends messages between a network node and each of its neighboring network nodes. CCP messages can only travel from one node to a neighbor node and cannot travel farther than that, based on usage of a reserved media access control (MAC) address. If a node does not receive CCP messages over a first physical link from a neighbor node at a rate above a certain predetermined threshold (e.g., 5 CCP messages per second), the node can determine a link error and send out the SF signal on its second (other or redundant) physical link, which can result in disabling the first physical link for user traffic. This can occur by first disabling network management traffic (e.g., traffic assigned to VLANs in a management-related STG), which subsequently disables customer data traffic (e.g., traffic assigned to VLANs in a customer-related STG), as described below in relation to FIG. 2.

In conventional systems, link flapping may affect the communication rate of CCP messages, which can affect when the RPL owner may switch the network from the idle state to the signal fail state (e.g., by enabling its RPL link). Thus, frequent link flapping may unnecessarily cause frequent switching, which can create issues in forwarding traffic and customer uplink issues to an external network.

The described aspects can reduce this problematic frequent switching by monitoring link flapping at the hardware level of the switch. When link flapping is detected on a physical link, the system can disable, on the physical link, both the network management traffic on the management VLAN and the customer data traffic on the customer VLAN. This can place the ring network in the signal fail state (as described in relation to FIGS. 1 and 3), while the system continues to monitor the link flapping. The ring network can thus stay in the signal fail state based on the monitored link flapping instead of based on the communication rate of CCP messages (as in conventional systems). The ring network can return to the idle state only when both the link flapping and the CCP message communication rate reach an acceptable threshold, thus reducing the frequency of switching and the consequential issues.

Communication Over a Physical Link Via a Management VLAN and a Customer VLAN

Figure 2:
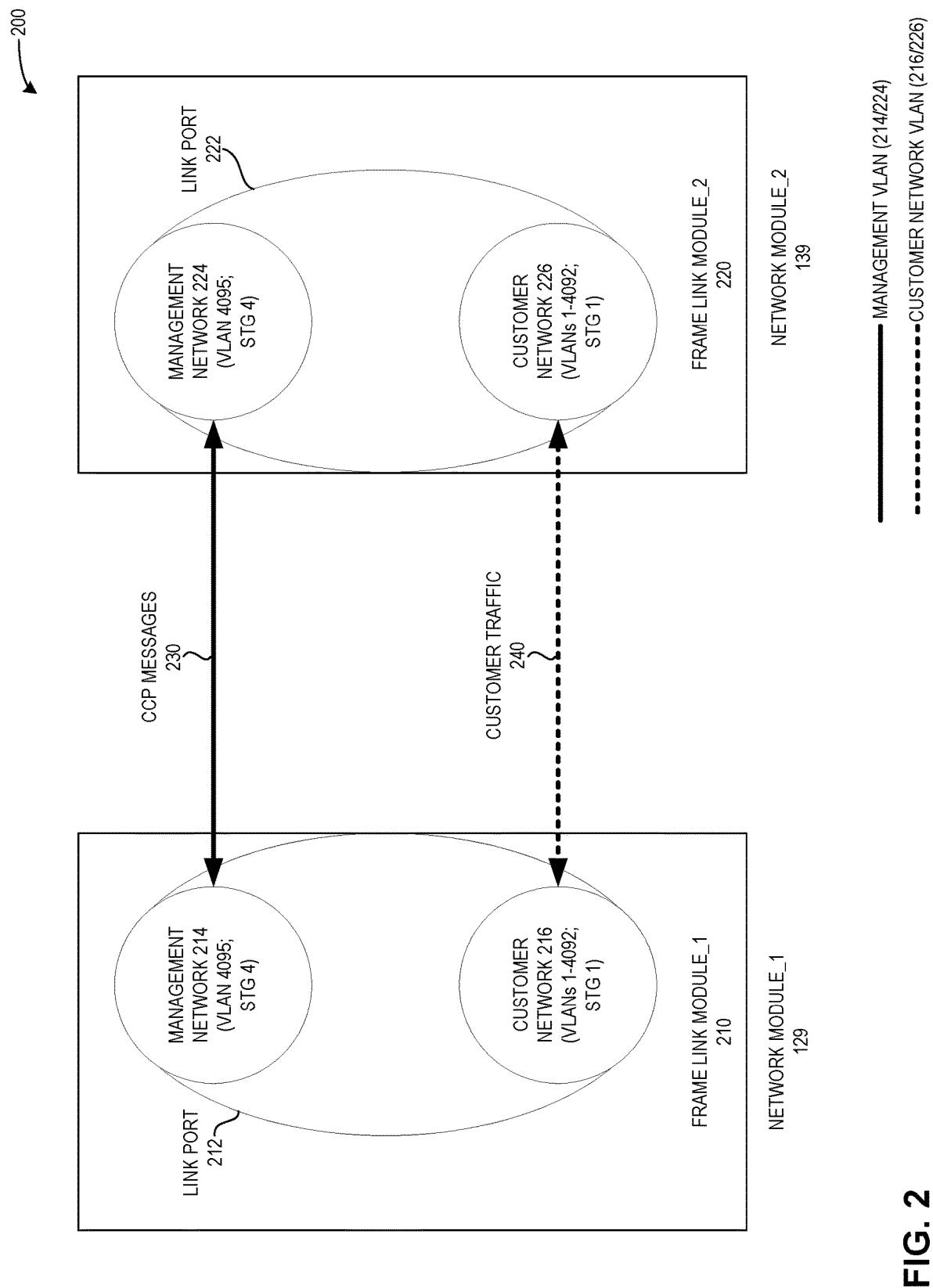
FIG. 2 illustrates a diagram depicting communication over a physical link via a management VLAN and a customer VLAN, in accordance with an aspect of the present application.

FIG. 2 illustrates a diagram 200 depicting communication over a physical link via a management VLAN and a customer VLAN, in accordance with an aspect of the present application. Diagram 200 includes two FLMs: a frame link module_1 210; and a frame link module_2 220. Each FLM can correspond to a network switch and CPU pair, as described above in relation to the network modules of FIG. 1 (e.g., network switch 120 and CPU 121 of network module_1 129). FLM_1 210 can include a link port 212 (e.g., link port 127 of FIG. 1), and FLM_2 220 can include a link port 222 (e.g., link port 133 of FIG. 1).

FLM_1 210 and FLM_2 220 can communicate (e.g., transmit and receive) data with each other. For example, G.8032 network management traffic can flow over a VLAN 4095 which is assigned to "STG 4," while customer data traffic can flow over VLANs 1-4092 which are assigned to "STG 1." Network management traffic (e.g., CCP messages 230) can be communicated/transported between FLM_1 210 (via a management network 214 (VLAN 4095; STG 4) on link port 212) and FLM_2 220 (via a management network 224 (VLAN 4095; STG 4) on link port 222). Furthermore, customer data traffic (e.g., customer traffic 240) can be communicated/transported between FLM_1 210 (via a customer network 216 (VLANs 1-4092; STG 1) on link port 212) and FLM_2 220 (via a customer network 226 (VLANs 1-4092; STG 1) on link port 222).

In the described aspects, the G.8032 protocol can monitor the link flapping and link errors associated with the physical links between each pair of nodes (e.g., by polling or obtaining other information from the hardware of the switch). Given nodes 210 and 220, if the system detects that the rate of CCP messages received by node 210 from node 220 over a physical link is below a first predetermined threshold (e.g., a "first condition" such as less than 5 CCPs per second), the system can disallow customer data traffic 240 on the VLANs assigned to STG 1. If the system detects that link flapping or link errors have occurred which are above a second predetermined threshold (e.g., a "second condition" such as more than 5 link flaps in 10 seconds), the system can disallow both CCP messages 230 (i.e., network management traffic) on the VLAN assigned to STG 4 as well as customer traffic 240 on the VLANs assigned to STG 1 (if that customer traffic 240 has not already been disallowed). This places the ring network in a signal fail state, as both nodes 210 and 220 would have sent out the SF upon detecting the first condition (as described herein in relation to FIGS. 1 and 3). This further maintains the ring network in the signal fail state, as CCP messages 230 remain disallowed on the VLAN assigned to STG 4

If the system detects that the link flapping or link errors of the second condition are no longer being met, the system can allow CCP messages 230 (i.e., network management traffic) on the VLAN assigned to STG 4. If the system detects that the rate of CCP messages 230 (received by node 210 from node 220 over the physical link) of the first condition is no longer being met, the system can allow customer data traffic 240 on the VLANs assigned to STG 1. This places the ring network in an idle state, as both nodes 210 and 220 would have stopped sending out the SF message, thus allowing customer data traffic 240 on the VLANs assigned to STG 1.

The ring network can thus be maintained in the signal fail state based on monitored metrics (i.e., relating to link flapping and link errors) and no longer entirely based on the first condition (as in conventional systems), which can result in preventing frequent switching between the signal fail state and the idle state.

One improvement or advantage of blocking or disallowing traffic on both the management VLAN and the customer VLAN while continuing to monitor the link flapping and link errors ("metrics") associated with the physical link is that the physical link itself can remain enabled. Various methods may be used to continue monitoring the metrics, including setting a timer to monitor the link flapping at predetermined intervals, etc. The system can leave STG 4 (the management VLAN) blocked for a period of time determined by the monitored rate of the metrics. For example, if the link flapping occurs frequently, STG 4 may be blocked for a longer period of time. If the link flapping stops, STG 4 may remain blocked for a period of time to determine if it is stable (as described herein). Because the physical link itself is still enabled, the system can still detect a physical cable being unplugged and/or replaced. If this occurs, G.8032 can re-enable STG 4 (allow traffic on the management VLAN), which can start sending CCP messages again, which in turn can cause the adjacent node to enable STG 1 for user traffic. This can end the SF state, thereby returning the ring to the idle state.

The G.8032 protocol can also issue an alert to the user, notifying the user that link flapping has occurred and the time that the link will be disabled. The user may view this information on a user interface displayed on a screen of a computing device which can receive data (e.g., alerts, notifications, etc.) from the nodes (e.g., via customer network 102 of FIG. 1). The alert may recommend a remedial action to be performed by the user, such as checking the cable connection or replacing the cable. When the G.8032 protocol detects that the cable has been replaced and that the link flapping is no longer occurring, the link can be re-enabled.

Ring Configurations in Idle and Signal Fail States (Based on Link Flapping)

Figure 3:
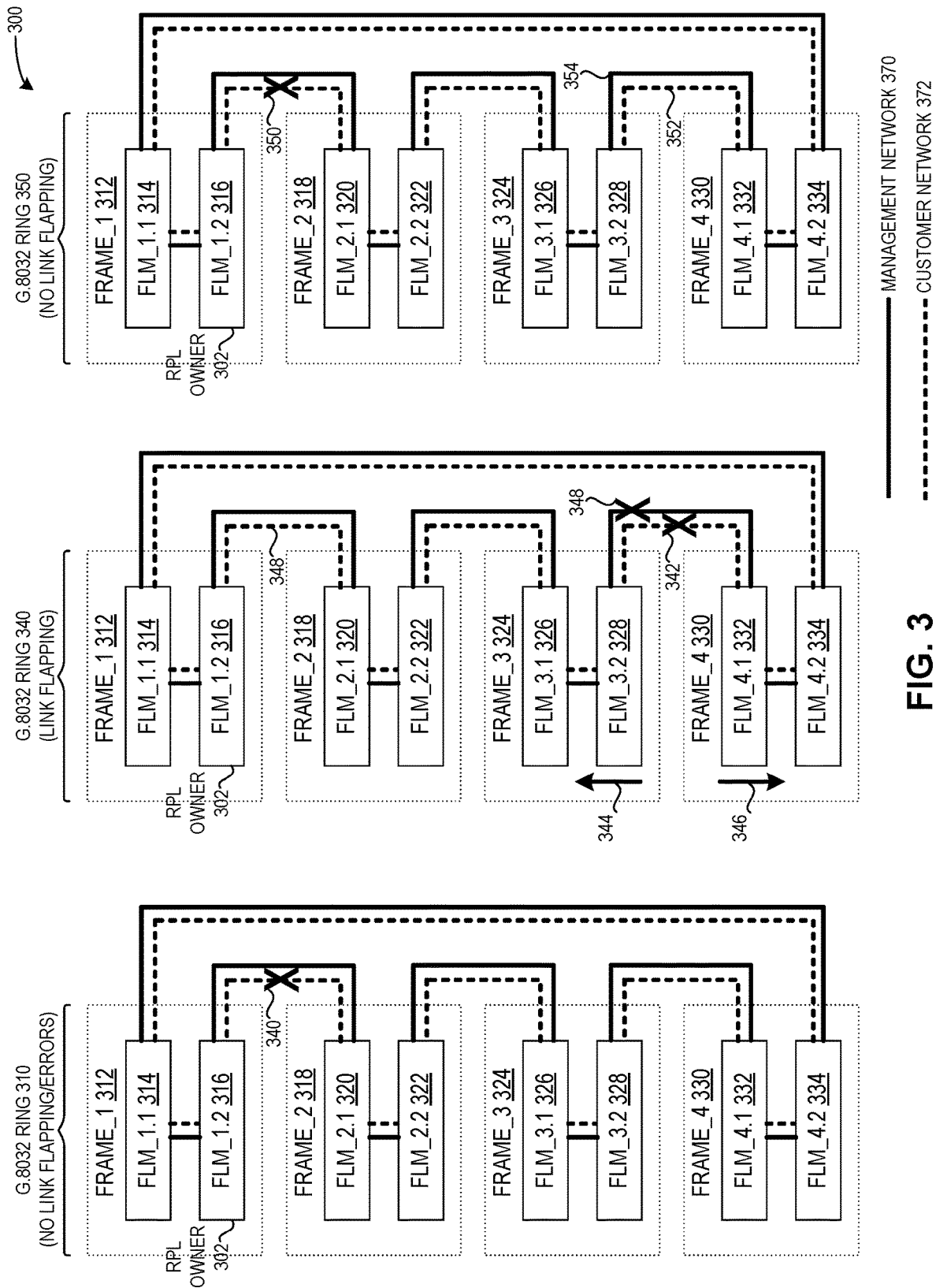
FIG. 3 illustrates a diagram depicting a ring configuration in three states, including communication between nodes via a management network and a customer network, in accordance with an aspect of the present application.

FIG. 3 illustrates a diagram 300 depicting a ring configuration in three states, including communication between nodes via a management network and a customer network, in accordance with an aspect of the present application. Diagram 300 depicts: a G.8032 ring 310 with no link flapping and no link errors, i.e., in the idle state; a G.8032 ring 340 with link flapping or link errors, i.e., in the signal fail state; and a G.8032 ring 350 with no link flapping and no link errors, i.e., in the idle state.

Ring 310 is depicted with four frames, where each frame includes two FLMs or nodes. The number of nodes in a frame can range from one to any number. Two nodes per frame are depicted in ring 310 for purposes of redundancy. A frame_1 312 can include an FLM_1.1 314 and an FLM_1.2 316; a frame_2 318 can include an FLM_2.1 320 and an FLM_2.2 322; a frame_3 324 can include an FLM_3.1 326 and an FLM_3.2 328; and a frame_4 330 can include an FLM_4.1 332 and an FLM_4.2 334. Each FLM or node in ring 310 can communicate with a first neighboring node via a first physical link and with a second neighboring node via a second physical link. Each link can transport both management network traffic (indicated by a solid bold line, as shown by 370 in the index) and customer data traffic (indicated by a dashed bold line, as shown by 372 in the index). FLM_1.2 316 can be designated as an RPL owner 302, where its link or connection to FLM_2.1 320 has been designated as the blocked RPL link (indicated by a bold "X" 340). At this stage, ring 310 now indicates the idle state.

In ring 340, given the two FLMs or nodes FLM_3.2 328 and FLM_4.1 332 and the physical link or connection between them, if the communication rate of CCP messages between these nodes falls below the first predetermined threshold ("first condition"), the system can disable traffic on the customer network 370 on the physical link between these two nodes (indicated by a bold "X" 342).

If link flapping or link errors above the second predetermined threshold is detected on the physical link or connection between these two nodes ("second condition"), each of these nodes can send out an SF message via its other links (indicated by an SF 344 sent from FLM_3.2 328 and by an SF 346 sent from FLM_4.1 332). As discussed above, RPL owner 302 can receive the SF (either 344 or 346 or both) and can enable or unblock its previously blocked RPL link (indicated by the lack of a bold "X" at element 348). At this stage, ring 340 now indicates the signal fail state.

In the described aspects, the system can continue to monitor metrics relating to link flapping and link errors associated with the physical link or connection between these two nodes (i.e., FLM_3.2 328 and FLM_4.1 332). If the monitored metrics indicate link flapping at a rate above the second predetermined threshold ("second condition"), the system can disable traffic on management network 370 between these two nodes (indicated by a bold "X" 348) and can also disable (if not already disabled) traffic on the customer network 370 between these two nodes (indicated by bold "X" 342). This maintains ring 340 in the signal fail state, i.e., keeping ring 340 stable while the link flapping is occurring without depending solely or entirely on the communication rate of CCP messages (as in conventional systems), as no CCP messages are being transmitted or received between these two nodes while the traffic on management network 370 is disabled on the physical link between these two nodes.

In ring 350, if the second condition is no longer met, the system can allow the management network traffic 370 (indicated by the lack of a bold "X" at an element 354), and if the first condition is no longer met, the system can allow the customer data traffic (indicated by the lack of a bold "X" at an element 352). The two nodes can stop sending out the SF message (indicated by a lack of SF messages sent by the two nodes in ring 350), and RPL owner 302 can disable or re-block the previously enabled RPL link (indicated by a bold "X" 350). At this stage, ring 350 returns to the idle state.

Environment with Patch Panel Connecting Nodes in Frames

Figure 4:
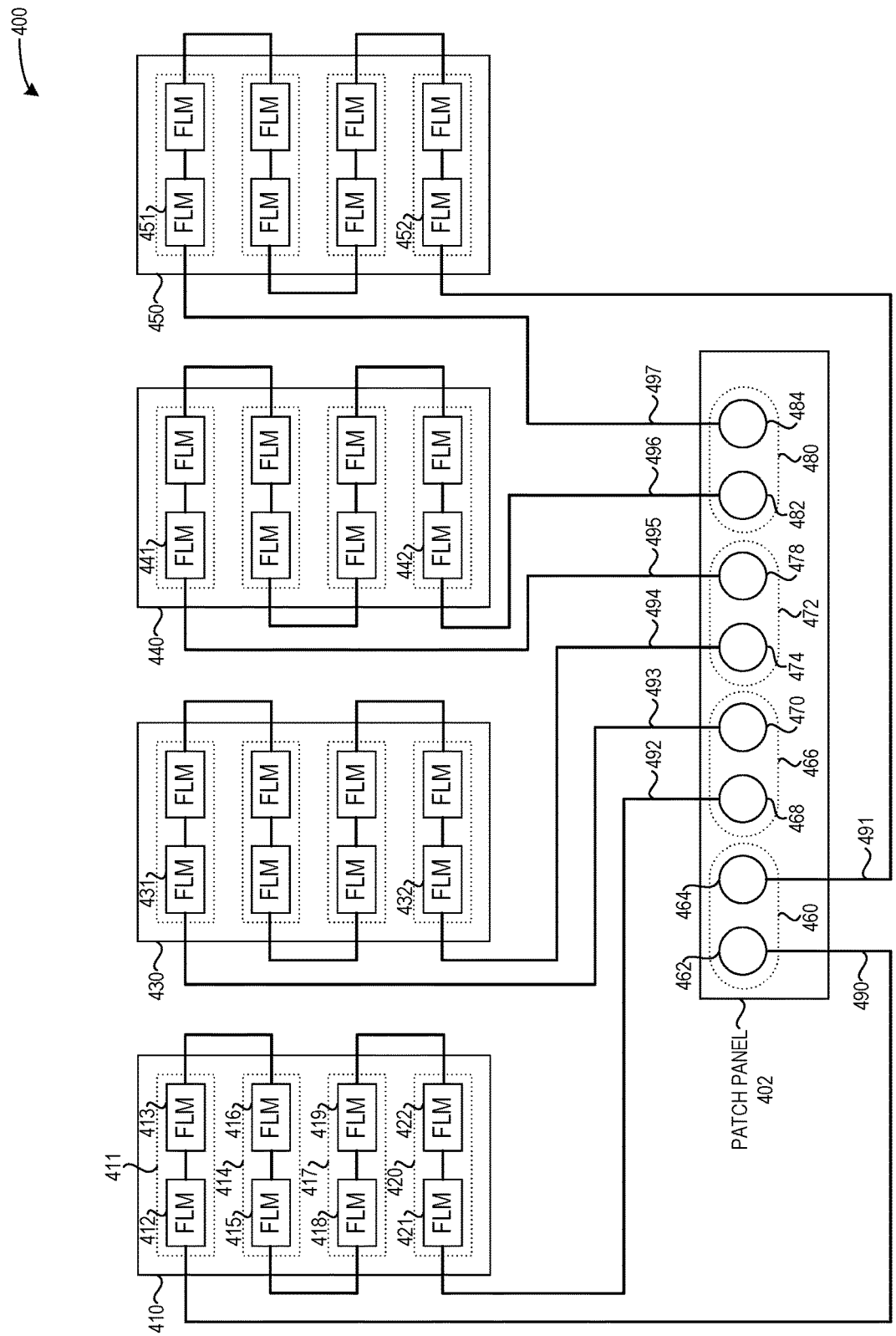
FIG. 4 illustrates an environment which facilitates stabilizing a ring during link flapping, including frames connected using a patch panel, in accordance with an aspect of the present application.

FIG. 4 illustrates an environment 400 which facilitates stabilizing a ring during link flapping, including frames connected using a patch panel, in accordance with an aspect of the present application. Environment 400 can include groups of frames in one or more racks, where each frame can include two FLMs or nodes (for redundancy purposes, as described above). Instead of connecting directly to nodes in other racks, each rack can be connected to another rack via a patch panel. That is, one node in a respective rack (at the edge of the ring) can connect to one of a pair of connectors in a first set on the patch panel, and another node in the respective rack (at the other edge of the ring) can connect to one of a pair of connectors in a second set on the patch panel.

Environment 400 can include: racks 410, 430, 440, and 450; and a patch panel 402. Patch panel 402 can include four sets of connectors, where each set can include a pair of connectors. A set 460 can include connectors 462 and 464; a set 466 can include connectors 468 and 470; a set 472 can include connectors 474 and 476; and a set 480 can include connectors 482 and 484. Each connector of a pair of connectors can connect or be communicatively coupled to a node of a different rack in a ring topology, as described below.

As an example, rack 410 can include four frames, each with a pair of FLMs or nodes: a frame 411 can include FLMs 412 and 413; a frame 414 can include FLMs 415 and 416; a frame 417 can include FLMs 418 and 419; and a frame 420 can include FLMs 421 and 422. The FLMs of rack 410 can be configured in a ring topology, as demonstrated by the lines between the FLMs of rack 410. In addition, FLM 412 can be configured to connect or be communicatively coupled to connector 462 (via a link 490), and FLM 421 can connect or be communicatively coupled to connector 468 (via a link 492). Similarly, other connections from other pairs of nodes in each rack to patch panel 402 may include: FLM 431 to connector 470 (via a link 493); FLM 432 to connector 474 (via a link 494); FLM 441 to connector 478 (via a link 495); FLM 442 to connector 482 (via a link 496); FLM 451 to connector 484 (via a link 497); and FLM 452 to connector 464 (via a link 491).

In some aspects, the connectors on patch panel 402 may be involved in a significant proportion of the link flapping which occurs in the ring network depicted in FIG. 4. Thus, in any network architecture design which includes nodes or FLMs in frames in racks (or other groupings) configured in a ring topology with a patch panel, link flapping may be expected to occur frequently. By monitoring link flapping while maintaining the signal fail state without relying entirely on the network management traffic (i.e., CCP message communication rate) to determine when to enable/disable (i.e., allow/disallow) a certain type of traffic over a physical link, the described aspects can enhance the stabilization of a ring network during link flapping, including in the configuration of FIG. 4.

Method Which Facilitates Stabilizing a Ring During Ring Flapping

Figure 5A:
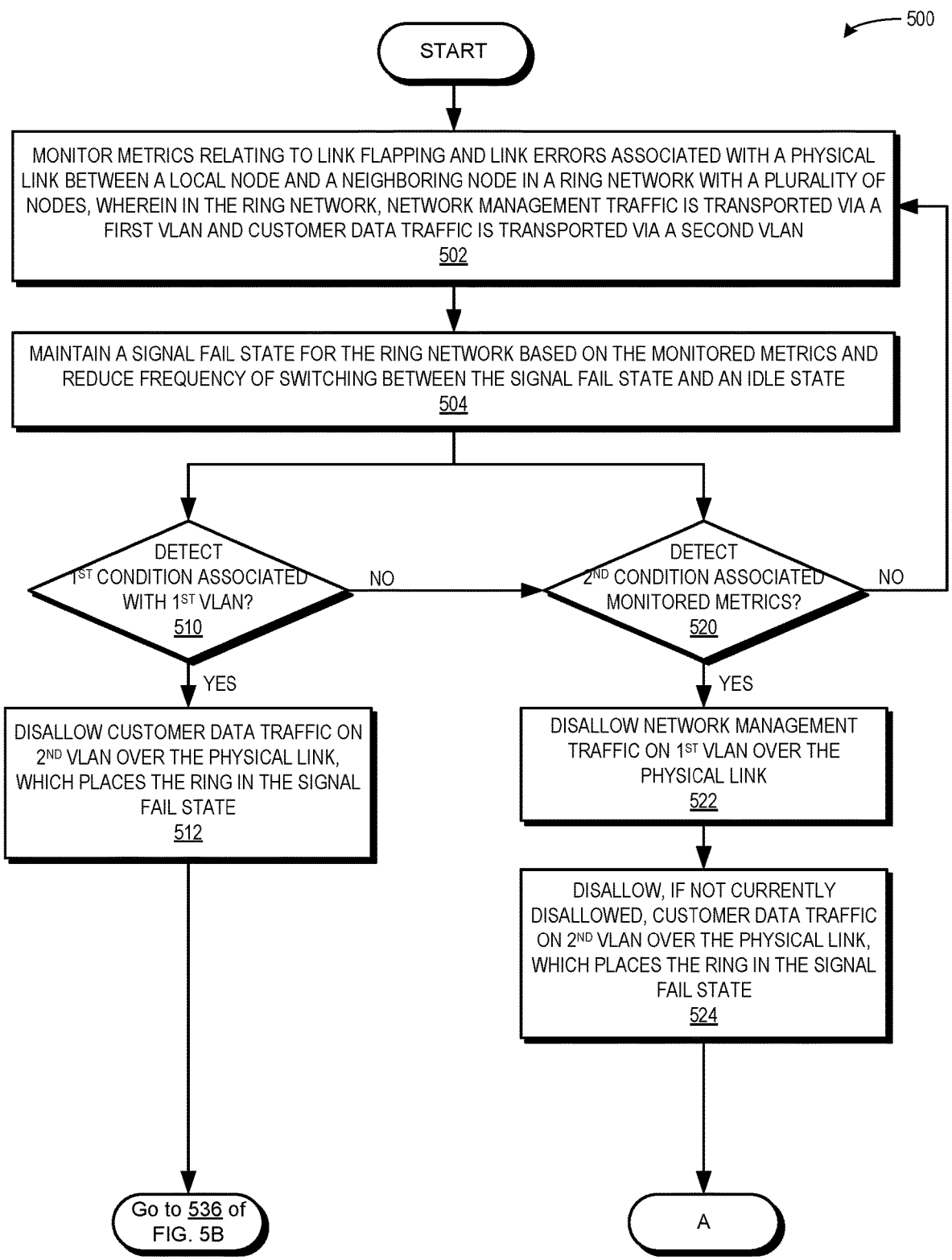
FIG. 5A presents a flowchart illustrating a method which facilitates stabilizing a ring during link flapping, in accordance with an aspect of the present application.

FIG. 5A presents a flowchart 500 illustrating a method which facilitates stabilizing a ring during link flapping, in accordance with an aspect of the present application. During operation, the system monitors metrics relating to link flapping and link errors associated with a physical link between a local node and a neighboring node in a network with a plurality of nodes, wherein in the ring network, network management traffic is transported via a first VLAN and customer data traffic is transported via a second VLAN (operation 502). The system maintains a signal fail state for the ring network based on the monitored metrics and reduces frequency of switching between the signal fail state and an idle state (operation 504), e.g., by the following operations. If the system detects a first condition associated with the first VLAN over the physical link (decision 510), the system disallows the customer data traffic on the second VLAN over the physical link, which places the ring in the signal fail state (operation 512), as described above in relation to FIGS. 1 and 3. If the system does not detect a first condition associated with the first VLAN over the physical link (decision 510), the operation continues at decision 520.

If the system detects a second condition associated with the monitored metrics over the physical link (decision 520), the system disallows the network management traffic on the first VLAN over the physical link (operation 522) and also disallows, if not currently disallowed, the customer data traffic on the second VLAN over the physical link, which places the ring network in the signal fail state (operation 524), as described above in relation to FIGS. 1 and 3. If the system does not detect a second condition associated with the monitored metrics over the physical link (decision 520), the operation continues at operation 502 (monitoring link flapping metrics). The operation continues at Label A of FIG. 5B.

Figure 5B:
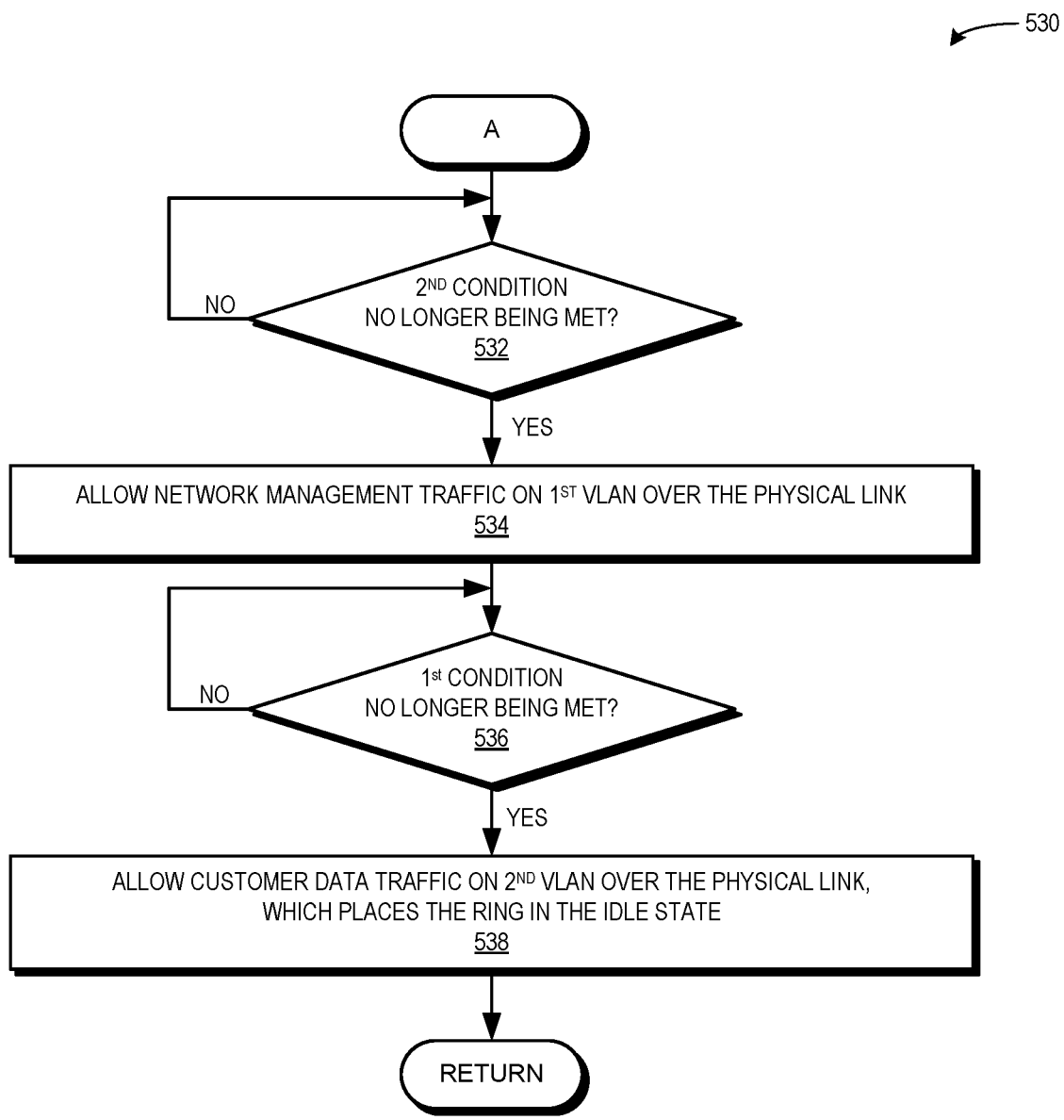
FIG. 5B presents a flowchart illustrating a method which facilitates stabilizing a ring during link flapping, in accordance with an aspect of the present application.

FIG. 5B presents a flowchart 530 illustrating a method which facilitates stabilizing a ring during link flapping, in accordance with an aspect of the present application. If the second condition is no longer being met (decision 532), the system allows the network management traffic on the first VLAN over the physical link. If the second condition is still being met (decision 532), the network remains in the signal fail state and the decision continues until the second condition is met. If the first condition is no longer being met (decision 536), the system allows the customer data traffic on the second VLAN over the physical link, which places the ring network in the idle state (operation 538). If the first condition is still being met (decision 536), the network remains in the signal fail state and the decision continues until the first condition is met. The operation returns after operation 538. Thus, flowcharts 500 and 530 depict how the described aspects can maintain the signal fail state based on the monitored metrics and not entirely based on the first condition and can further prevent frequent switching between the signal fail state and the idle state.

Figure 6:
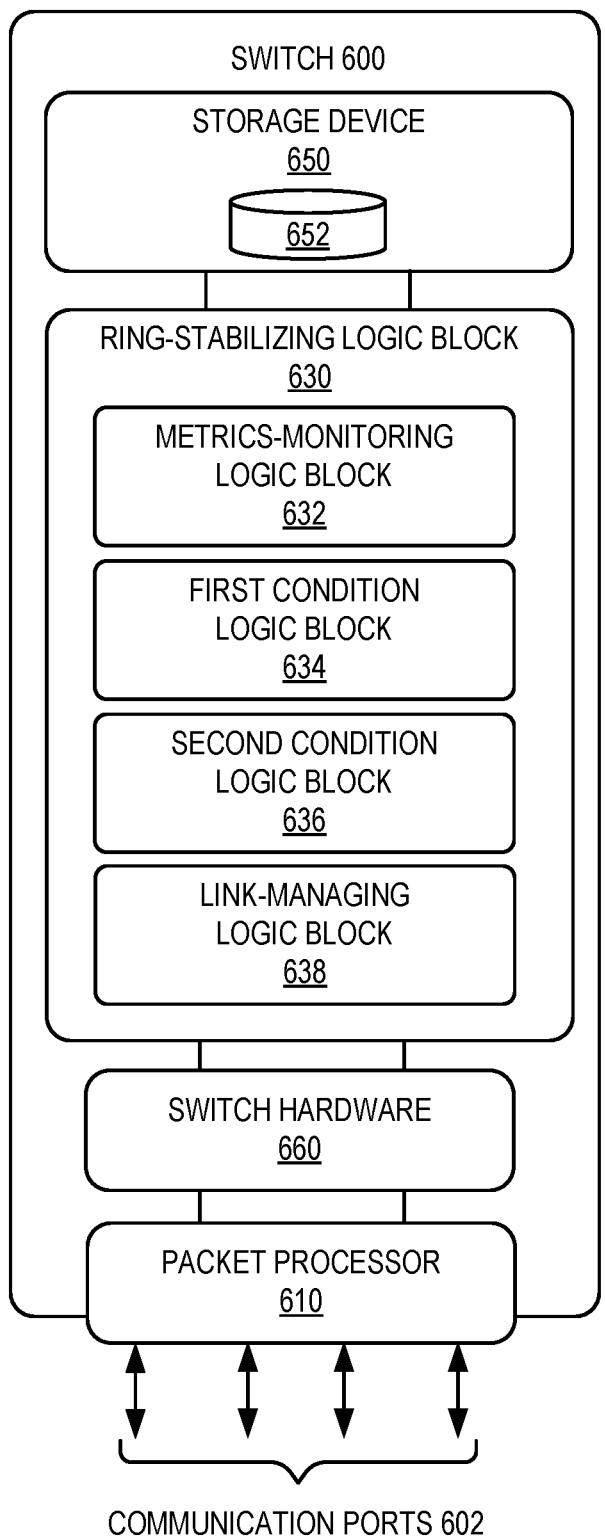
FIG. 6 illustrates a network device (e.g., a switch) which facilitates stabilizing a ring during link flapping, in accordance with an aspect of the present application.

Network Device and Computer System Which Facilitate Stabilizing a Ring in the Presence of Ring Flapping FIG. 6 illustrates a network device (e.g., a switch 600) which facilitates stabilizing a ring during link flapping, in accordance with an aspect of the present application. Switch 600 can include a number of communication ports 602, a packet processor 610, and a storage device 650. Switch 600 can also include switch hardware 660 (e.g., processing hardware of switch 600, such as its ASIC chips), which includes information based on which switch 600 processes packets (e.g., determines output ports for packets). Packet processor 610 can extract and process header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interfaces of switch 600. Database 652 may store data related to monitored metrics relating to link flapping and link errors associated with a physical link (e.g., via one of communication ports 602). Switch 600 can include a ring-stabilizing logic block 630 that can facilitate stabilizing a ring during ring flapping. Ring-stabilizing logic block 630 can include: a metrics-monitoring logic block 632; a first condition logic block 634; a second condition logic block 636; and a link-managing logic block 638. Metrics-monitoring logic block 630 can monitor metrics relating to link flapping and link errors associated with a physical link between a local node and a neighboring node in a ring network in which network management traffic is transported via a first VLAN and customer data traffic is transported via a second VLAN. Link-managing logic block 638 can maintain a signal fail state for the ring network based on the monitored metrics and reduce frequency of switching between the signal fail state and an idle state by performing certain operations, as described herein and below. First condition logic block 634 can detect a first condition associated with the first VLAN over the physical link and can detect when the first condition is no longer being met. Second condition logic block 636 can detect a second condition associated with the monitored metrics over the physical link and can detect when the second condition is no longer being met. Link-managing logic block 638 can further allow and disallow the network management traffic on the first VLAN based on the second condition (as described above in relation to FIGS. 1, 2, and 3). Link-managing logic block 638 can also allow and disallow the customer data traffic on the second VLAN based on the first or second condition (as described above in relation to FIGS. 1, 2, and 3).

Figure 7:
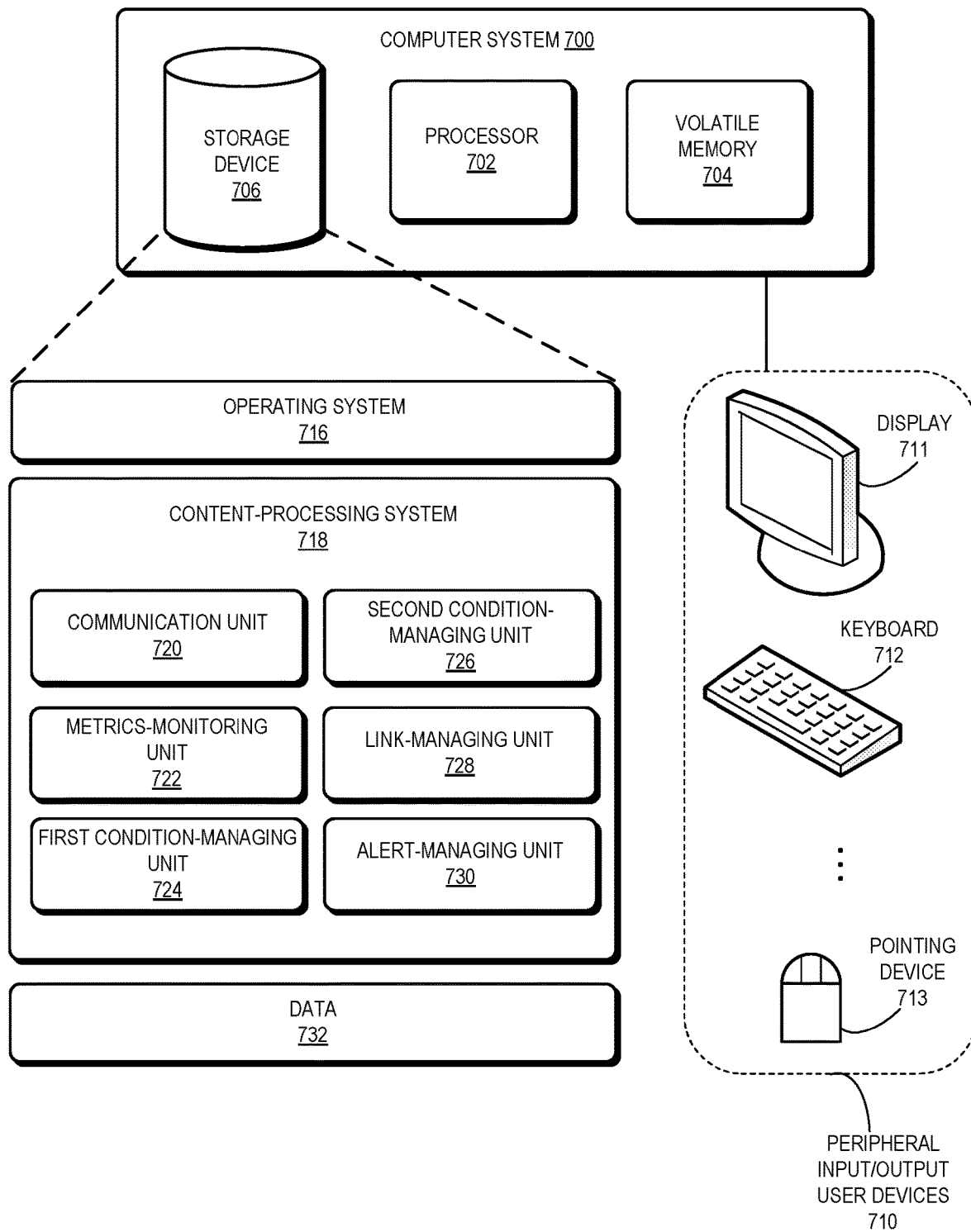
FIG. 7 illustrates a computer system which facilitates stabilizing a ring during link flapping, in accordance with an aspect of the present application.

FIG. 7 illustrates a computer system 700 which facilitates stabilizing a ring during link flapping, in accordance with an aspect of the present application. Computer system 700 includes a processor 702, a memory 704, and a storage device 706. Memory 704 can include a volatile memory (e.g., RAM) that serves as a managed memory, and can be used to store one or more memory pools. Furthermore, computer system 700 can be coupled to peripheral input/output (I/O) user devices 710 (e.g., a display device 711, a keyboard 712, and a pointing device 713). Storage device 706 can store an operating system 716, a content-processing system 718, and data 732.

Content-processing system 718 can include instructions, which when executed by computer system 700, can cause computer system 700 to perform methods and/or processes described in this disclosure. Specifically, content-processing system 720 may include instructions for sending and/or receiving data to/from other modules/units/components within computer system 700 or to/from other network nodes across a computer network (communication unit 720).

Content-processing system 718 can further include instructions for monitoring metrics relating to link flapping and link errors associated with a physical link between a local node and a neighboring node in the ring network in which network management traffic is transported via a first VLAN and customer data traffic is transported via a second VLAN (metrics-monitoring unit 722). Content-processing system 718 can include instructions for maintaining a signal fail state for the ring network based on the monitored metrics and reducing frequency of switching between the signal fail state and an idle state (link-managing unit 728). Content-processing system 718 can include instructions for, responsive to detecting a first condition associated with the first VLAN over the physical link (first condition-managing unit 724), disallowing the customer data traffic on the second VLAN over the physical link (link-managing unit 728). Content-processing system 718 can additionally include instructions for, responsive to detecting a second condition associated with the monitored metrics over the physical link (second condition-managing unit 726): disallowing the network management traffic on the first VLAN over the physical link (link-managing unit 728); and disallowing, if not currently disallowed, the customer data traffic on the second VLAN over the physical link, which places the ring network in the signal fail state (link-managing unit 728).

Content-processing system 718 can also include instructions for, responsive to the second condition no longer being met (second condition-managing unit 726), allowing the network management traffic on the first VLAN over the physical link (link-managing unit 728). Content-processing system 718 can include instructions for, responsive to the first condition no longer being met (first condition-managing unit 724), allowing the customer data traffic on the second VLAN over the physical link, which places the ring network in the idle state (link-managing unit 728).

Content-processing system 718 can further include instructions for issuing to a user an alert which notifies the user about various link-related information, e.g., that link flapping has occurred on particular physical link and the time that the particular physical link will be disabled (alert-managing unit 730).

Data 732 can include any data that is required as input or that is generated as output by the methods and/or processes described in this disclosure. Specifically, data 732 can store at least: data; metrics; link flapping metrics; link error metrics; information which identifies a node, local node, remote node, or neighboring node; an indicator of a physical link between two nodes; an indicator of a signal fail state or an idle state; an identifier of a VLAN; an identifier of a spanning tree group; a condition; an indicator of a type of traffic, including network management traffic and customer data traffic; an indicator of allowing or disallowing traffic over a particular physical link; a result of a determination of whether a condition is met; a CCP message; a predetermined threshold; a signal fail (SF) message; an R-APS SF message; other R-APS messages; an indicator of a ring owner or an RPL owner; information relating to executing or communicating via a G.8032 protocol; an indicator or identifier of a patch panel, rack, a frame, a frame link module (FLM); and an indicator of an FLM with two nodes.

In general, the disclosed aspects provide a method, network device, and computer system for facilitating managing link flapping in a ring network. In one aspect, the system monitors metrics relating to link flapping and link errors associated with a physical link between a local node and a neighboring node in the ring network in which network management traffic is transported via a first VLAN and customer data traffic is transported via a second VLAN. The system maintains a signal fail state for the ring network based on the monitored metrics and reducing frequency of switching between the signal fail state and an idle state by performing the following operations. Responsive to detecting a first condition associated with the first VLAN over the physical link, the system disallows the customer data traffic on the second VLAN over the physical link. Responsive to detecting a second condition associated with the monitored metrics over the physical link: the system disallows the network management traffic on the first VLAN over the physical link; and the system disallows, if not currently disallowed, the customer data traffic on the second VLAN over the physical link, which places the ring network in the signal fail state. Responsive to the second condition no longer being met, the system allows the network management traffic on the first VLAN over the physical link. Responsive to the first condition no longer being met, the system allows the customer data traffic on the second VLAN over the physical link, which places the ring network in the idle state.

In a variation on this aspect, the first condition comprises continuity check protocol (CCP) messages communicated at a rate below a first predetermined threshold.

In a further variation on this aspect, the second condition comprises link flapping and link errors at a rate above a second predetermined threshold.

In a further variation, the local node communicates with another neighboring node over another physical link between the local node and the other neighboring node. Responsive to detecting the second condition associated with the monitored metrics over the physical link, the system sends a signal fail message over the other physical link, which when received by an owner of the ring network: causes the ring owner to allow customer data traffic on the second VLAN over a corresponding physical link which previously disallowed customer data traffic on the second VLAN; and places the ring network in the signal fail state.

In a further variation, disallowing the network management traffic on the first VLAN comprises disabling a first spanning tree group associated with a VLAN over which continuity check protocol messages are communicated. Disallowing the customer data traffic on the second VLAN comprises disabling a second spanning tree group associated with one or more VLANs over which customer data traffic is communicated.

In a further variation, allowing the network management traffic on the first VLAN comprises enabling the first spanning tree group. Allowing the customer data traffic on the second VLAN comprises: enabling the second spanning tree group; and ceasing to send the signal fail (SF) message over the other physical link, which causes the ring owner to disallow customer data traffic on the second VLAN over the corresponding physical link and places the ring network in the idle state.

In a further variation: a respective node comprises a switch and a central processing unit (CPU); the CPU runs a G.8032 protocol; the signal fail message comprises a Ring Automatic Protection Switching (R-APS) Signal Fail (SF) message; and monitoring the metrics related to link flapping and link errors associated with the physical link is performed by software drivers on the CPU obtaining information from hardware associated with the switch.

In a further variation, wherein subsequent to disallowing the network management traffic on the first VLAN over the physical link or disallowing the customer data traffic on the second VLAN over the physical link, the physical link remains enabled, thereby allowing monitoring of the physical link for flapping and errors while maintaining the physical link as enabled without causing traffic flow issues in the ring network.

In a further variation: the nodes in the ring network reside in one or more racks; a respective rack comprises one or more frames; a respective frame comprises a plurality of frame link modules; a respective frame link module comprises one or more of the nodes, and each frame is connected to two neighboring frames via two connectors on a patch panel.

In a further variation, the respective frame link module comprises two nodes for redundancy.

In another aspect, a non-transitory computer-readable storage medium stores instructions that when executed by a computer cause the computer to perform the method described above, including in relation to FIGS. 1, 2, 3, 5A, and 5B.

In yet another aspect, a computer system comprises a processor and a storage device which stores instructions that when executed by the processor cause the processor to perform the method as described above, including in relation to FIGS. 1, 2, 3, 5A, and 5B.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method for managing link flapping in a ring network with a plurality of nodes, the method comprising:
monitoring metrics relating to link flapping and link errors associated with a physical link between a local node and a neighboring node in the ring network in which network management traffic is transported via a first virtual local area network (VLAN) and customer data traffic is transported via a second VLAN; and
maintaining a signal fail state for the ring network based on the monitored metrics and reducing frequency of switching between the signal fail state and an idle state by:
responsive to detecting a first condition associated with the first VLAN over the physical link, disallowing the customer data traffic on the second VLAN over the physical link;
responsive to detecting a second condition associated with the monitored metrics over the physical link:
disallowing the network management traffic on the first VLAN over the physical link; and
disallowing, if not currently disallowed, the customer data traffic on the second VLAN over the physical link, which places the ring network in the signal fail state;
responsive to the second condition no longer being met, allowing the network management traffic on the first VLAN over the physical link; and
responsive to the first condition no longer being met, allowing the customer data traffic on the second VLAN over the physical link, which places the ring network in the idle state.

2. The method of claim 1,
wherein the first condition comprises continuity check protocol (CCP) messages communicated at a rate below a first predetermined threshold.

3. The method of claim 1,
wherein the second condition comprises link flapping and link errors at a rate above a second predetermined threshold.

4. The method of claim 1,
wherein the local node communicates with another neighboring node over another physical link between the local node and the other neighboring node, and
wherein responsive to detecting the second condition associated with the monitored metrics over the physical link, the method further comprises sending a signal fail message over the other physical link, which when received by an owner of the ring network:
causes the ring owner to allow customer data traffic on the second VLAN over a corresponding physical link which previously disallowed customer data traffic on the second VLAN; and
places the ring network in the signal fail state.

5. The method of claim 4,
wherein disallowing the network management traffic on the first VLAN comprises disabling a first spanning tree group associated with a VLAN over which continuity check protocol messages are communicated, and
wherein disallowing the customer data traffic on the second VLAN comprises disabling a second spanning tree group associated with one or more VLANs over which customer data traffic is communicated.

6. The method of claim 5,
wherein allowing the network management traffic on the first VLAN comprises enabling the first spanning tree group, and
wherein allowing the customer data traffic on the second VLAN comprises:
enabling the second spanning tree group; and
ceasing to send the signal fail (SF) message over the other physical link, which causes the ring owner to disallow customer data traffic on the second VLAN over the corresponding physical link and places the ring network in the idle state.

7. The method of claim 4,
wherein a respective node comprises a switch and a central processing unit (CPU),
wherein the CPU runs a G.8032 protocol,
wherein the signal fail message comprises a Ring Automatic Protection Switching (R-APS) Signal Fail (SF) message, and
wherein monitoring the metrics related to link flapping and link errors associated with the physical link is performed by software drivers on the CPU obtaining information from hardware associated with the switch.

8. The method of claim 1,
wherein subsequent to disallowing the network management traffic on the first VLAN over the physical link or disallowing the customer data traffic on the second VLAN over the physical link, the physical link remains enabled,
thereby allowing monitoring of the physical link for flapping and errors while maintaining the physical link as enabled without causing traffic flow issues in the ring network.

9. The method of claim 1,
wherein the nodes in the ring network reside in one or more racks,
wherein a respective rack comprises one or more frames,
wherein a respective frame comprises a plurality of frame link modules,
wherein a respective frame link module comprises one or more of the nodes, and
wherein each frame is connected to two neighboring frames via two connectors on a patch panel.

10. The method of claim 9,
wherein the respective frame link module comprises two nodes for redundancy.

11. A non-transitory computer-readable storage medium storing instructions that when executed by a computer cause the computer to perform a method, the method comprising:
monitoring metrics relating to link flapping and link errors associated with a physical link between a local node and a neighboring node in the ring network in which network management traffic is transported via a first virtual local area network (VLAN) and customer data traffic is transported via a second VLAN; and
maintaining a signal fail state for the ring network based on the monitored metrics and reducing frequency of switching between the signal fail state and an idle state by:
responsive to detecting a first condition associated with the first VLAN over the physical link, disallowing the customer data traffic on the second VLAN over the physical link;
responsive to detecting a second condition associated with the monitored metrics over the physical link;
disallowing the network management traffic on the first VLAN over the physical link; and disallowing, if not currently disallowed, the customer data traffic on the second VLAN over the physical link, which places the ring network in the signal fail state;
responsive to the second condition no longer being met, allowing the network management traffic on the first VLAN over the physical link; and
responsive to the first condition no longer being met, allowing the customer data traffic on the second VLAN over the physical link, which places the ring network in the idle state.

12. The non-transitory computer-readable storage medium of claim 11,
wherein the first condition comprises continuity check protocol (CCP) messages communicated at a rate below a first predetermined threshold.

13. The non-transitory computer-readable storage medium of claim 11,
wherein the second condition comprises link flapping and link errors at a rate above a second predetermined threshold.

14. The non-transitory computer-readable storage medium of claim 11,
wherein the local node communicates with another neighboring node over another physical link between the local node and the other neighboring node, and
wherein responsive to detecting the second condition associated with the monitored metrics over the physical link, the method further comprises sending a signal fail message over the other physical link, which when received by an owner of the ring network:
causes the ring owner to allow customer data traffic on the second VLAN over a corresponding physical link which previously disallowed customer data traffic on the second VLAN; and
places the ring network in the signal fail state.

15. The non-transitory computer-readable storage medium of claim 14,
wherein disallowing the network management traffic on the first VLAN comprises disabling a first spanning tree group associated with a VLAN over which continuity check protocol messages are communicated, and
wherein disallowing the customer data traffic on the second VLAN comprises disabling a second spanning tree group associated with one or more VLANs over which customer data traffic is communicated.

16. The non-transitory computer-readable storage medium of claim 15,
wherein allowing the network management traffic on the first VLAN comprises enabling the first spanning tree group, and
wherein allowing the customer data traffic on the second VLAN comprises:
enabling the second spanning tree group; and
ceasing to send the signal fail (SF) message over the other physical link, which causes the ring owner to disallow customer data traffic on the second VLAN over the corresponding physical link and places the ring network in the idle state.

17. The non-transitory computer-readable storage medium of claim 14,
wherein a respective node comprises a switch and a central processing unit (CPU),
wherein the CPU runs a G.8032 protocol,
wherein the signal fail message comprises a Ring Automatic Protection Switching (R-APS) Signal Fail (SF) message, and
wherein monitoring the metrics related to link flapping and link errors associated with the physical link is performed by software drivers on the CPU obtaining information from hardware associated with the switch.

18. The non-transitory computer-readable storage medium of claim 11,
wherein subsequent to disallowing the network management traffic on the first VLAN over the physical link or disallowing the customer data traffic on the second VLAN over the physical link, the physical link remains enabled,
thereby allowing monitoring of the physical link for flapping and errors while maintaining the physical link as enabled without causing traffic flow issues in the ring network.

19. The non-transitory computer-readable storage medium of claim 11,
wherein the nodes in the ring network reside in one or more racks,
wherein a respective rack comprises one or more frames,
wherein a respective frame comprises a plurality of frame link modules,
wherein a respective frame link module comprises one or more of the nodes, and
wherein each frame is connected to two neighboring frames via two connectors on a patch panel.

20. A computer system, comprising:
a processor; and
a storage device storing instructions that when executed by the processor cause the processor to perform a method, the method comprising:
monitoring metrics relating to link flapping and link errors associated with a physical link between a local node and a neighboring node in the ring network in which network management traffic is transported via a first virtual local area network (VLAN) and customer data traffic is transported via a second VLAN; and
maintaining a signal fail state for the ring network based on the monitored metrics and reducing frequency of switching between the signal fail state and an idle state by:
responsive to detecting a first condition associated with the first VLAN over the physical link, disallowing the customer data traffic on the second VLAN over the physical link;
responsive to detecting a second condition associated with the monitored metrics over the physical link:
disallowing the network management traffic on the first VLAN over the physical link; and
disallowing, if not currently disallowed, the customer data traffic on the second VLAN over the physical link, which places the ring network in the signal fail state;
responsive to the second condition no longer being met, allowing the network management traffic on the first VLAN over the physical link; and
responsive to the first condition no longer being met, allowing the customer data traffic on the second VLAN over the physical link, which places the ring network in the idle state.

* * * * *